United States Patent [19]

Saito

[11] Patent Number: 5,745,806
[45] Date of Patent: Apr. 28, 1998

[54] DISTANCE MEASURING APPARATUS

[75] Inventor: Tatsuo Saito, Saitama, Japan

[73] Assignee: Fuji Photo Optical Co., Ltd., Saitama, Japan

[21] Appl. No.: 661,547

[22] Filed: Jun. 11, 1996

[30] Foreign Application Priority Data

| Jun. 15, 1995 | [JP] | Japan | ................ 7-149141 |
| Jun. 15, 1995 | [JP] | Japan | ................ 7-149144 |
| Jun. 15, 1995 | [JP] | Japan | ................ 7-149151 |

[51] Int. Cl.$^6$ ............................ G03B 13/20; G03B 13/18
[52] U.S. Cl. ............................ 396/106; 396/109
[58] Field of Search ............................ 354/403, 163, 354/162; 396/106–109

[56] References Cited

U.S. PATENT DOCUMENTS

| 4,494,847 | 1/1985 | Yamada | ........................ 354/403 |
| 4,518,242 | 5/1985 | Toyama . | |
| 4,592,638 | 6/1986 | Kaneda et al. . | |
| 4,799,078 | 1/1989 | Hayama | ........................ 354/484 |
| 4,947,202 | 8/1990 | Kitajima et al. | ........................ 354/403 |
| 5,081,344 | 1/1992 | Misawa | ........................ 250/201.4 |
| 5,121,153 | 6/1992 | Yamada et al. | ........................ 354/403 |
| 5,121,154 | 6/1992 | Yamada et al. | ........................ 354/403 |
| 5,315,342 | 5/1994 | Cocca | ........................ 354/403 |

*Primary Examiner*—Safet Metjahic
*Assistant Examiner*—Michael Dalakis
*Attorney, Agent, or Firm*—Leydig, Voit & Mayer

[57] ABSTRACT

A distance measuring apparatus includes distance measuring units of the active and passive methods, and a distance-value selecting circuit for selecting and outputting one of distance measurement results obtained from these distance measuring units. When a self-timer mode is set, distance measurement of the active method is inhibited, and distance measurement is executed by only the passive method. When the power supply voltage is lower than a predetermined voltage value at which distance measurement can be properly executed by the active method, distance measurement by the active method is inhibited, and distance measurement is executed by only the passive method. Therefore, erroneous distance measurement can be prevented, and distance measurement having high reliability can be performed.

12 Claims, 9 Drawing Sheets

DISTANCE MEASURING APPARATUS

BACKGROUND OF THE INVENTION

1. Field of the Invention

The present invention relates to a distance measuring apparatus and, more particularly, to a distance measuring apparatus for a camera which automatically measures the distance to an object.

2. Related Background Art

Conventionally, as a distance measuring apparatus for a camera which automatically measures the distance to an object, a trigonometric distance measuring apparatus of the active method is well known which has a light source for distance measurement such as an LED and measures the distance to an object in combination with a light-receiving element.

As a distance measuring apparatus of another method, a trigonometric distance measuring apparatus of the passive method is known which has no light source for distance measurement, receives the natural light reflected by the object through two optical systems, and measures the distance to the object in accordance with a phase difference between two optical images obtained through the respective optical systems, and the like.

In the above-described distance measuring apparatus of the active method, a light-emitting element is caused to emit light, the emitted light is projected as distance measuring light on the object, and the distance measuring light reflected by the object is received to measure the distance to the object. When the luminance of the external field is high, however, a light-receiving element cannot properly receive the reflected light of the distance measuring light, resulting in lowering the distance measurement accuracy or disabling the distance measurement depending on the luminance of the external field. To measure the distance to a far object, the light-emitting quantity is desirably large. For this purpose, a large current must always be supplied to the light-emitting element. Since a battery serving as the current supply source decreases in capacitance in use, the voltage of the battery drops in a certain period of use, and a required current cannot be supplied to the light-emitting element. Taking processing is possible even in this state, but if distance measurement of the active method is executed with respect to the far object, the distance measurement error becomes large, and its photograph becomes so-called out of focus. Further, since the range subjected to distance measurement is determined by the light-emitting diameter of distance measuring light, the distance measurement range with respect to the taking range becomes narrow.

On the other hand, a distance measuring apparatuses of a passive method is a system for receiving the natural light reflected by the whole object. Since the distance measurement range of the passive method is ensured by a length corresponding to the performance of a sensor which can receive the reflected light, its distance measurement range is relatively wider than that of the active method. When the luminance of the external field is low, however, the reflected light quantity of the natural light by the object becomes low, as a matter of course. For this reason, it is difficult to detect a phase difference between two optical images, resulting in lowering the distance measurement accuracy or disabling the distance measurement.

When taking processing is executed with a camera having a self-timer, generally, a person himself/herself who has performed a release operation moves upon the release operation and enters a taking frame, and then taking processing is performed. In this case, it is difficult for the person who has performed the release operation to suitably enter the center of the taking frame, and it is difficult to predict a position to which the person moves in the taking frame. For this reason, the person cannot move to the center of the taking frame, and another object at the center is undesirably focused, i.e., the photograph often becomes so-called out of focus.

SUMMARY OF THE INVENTION

The present invention has been made to solve the drawbacks, and has as its object to provide a distance measuring apparatus capable of always obtaining a highly reliable distance measurement result.

It is another object of the present invention to provide a distance measuring apparatus capable of preventing erroneous distance measurement even when taking processing is executed using a self-timer.

It is still another object of the present invention to provide a distance measuring apparatus capable of preventing erroneous distance measurement even in the situation wherein the power supply voltage is low.

According to the present invention, there is provided a distance measuring apparatus comprising first distance measuring means of an active method for projecting distance measuring light on an object to calculate a distance to the object based on a condensed position of reflected light reflected by the object, second distance measuring means of a passive method for receiving natural light reflected by the object through two optical systems to calculate the distance to the object based on two optical images obtained through the respective optical systems, distance-value selecting means for selecting and outputting one of distance measurement results obtain ed by the first and second distance measuring means, and detecting means for detecting setting of a self-timer mode.

According to the present invention, there is provided a distance measuring apparatus comprising first distance measuring means of an active method for projecting distance measuring light on an object to calculate a distance to the object based on a condensed position of reflected light reflected by the object, second distance measuring means of a passive method for receiving natural light reflected by the object through two optical systems to calculate the distance to the object based on two optical images obtained through the respective optical systems, distance-value selecting means for selecting and outputting one of distance measurement results obtained by the first and second distance measuring means, power supply means for supplying a current to the first and second distance measuring means and the distance-value selecting means, and detecting means for detecting an output voltage from the power supply means, wherein the distance-value selecting means comprises comparing means for comparing a predetermined power supply voltage value at which distance measurement can be properly executed by the first distance measuring means, with the voltage value detected by the detecting means.

According to the present invention, there is provided a distance measuring apparatus comprising first distance measuring means of an active method for projecting distance measuring light on an object to calculate a distance to the object based on a condensed position of reflected light reflected by the object, second distance measuring means of a passive method for receiving natural light reflected by the object through two optical systems to calculate the distance to the object based on two optical images obtained through the respective optical systems, distance-value selecting means for selecting and outputting one of distance measurement results obtained by the first and second distance measuring means, power supply means for supplying a current to the first and second distance measuring means and the distance-value selecting means, and detecting means for detecting an output voltage from the power supply means, wherein the distance-value selecting means comprises setting means for setting a distance measurement range in which the first distance measuring means can properly execute distance measurement, based on the output voltage, detected by the detecting means, from the power supply means.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Embodiments of the present invention will be described below with reference to the accompanying drawings.

Embodiment 1

Figure 1:
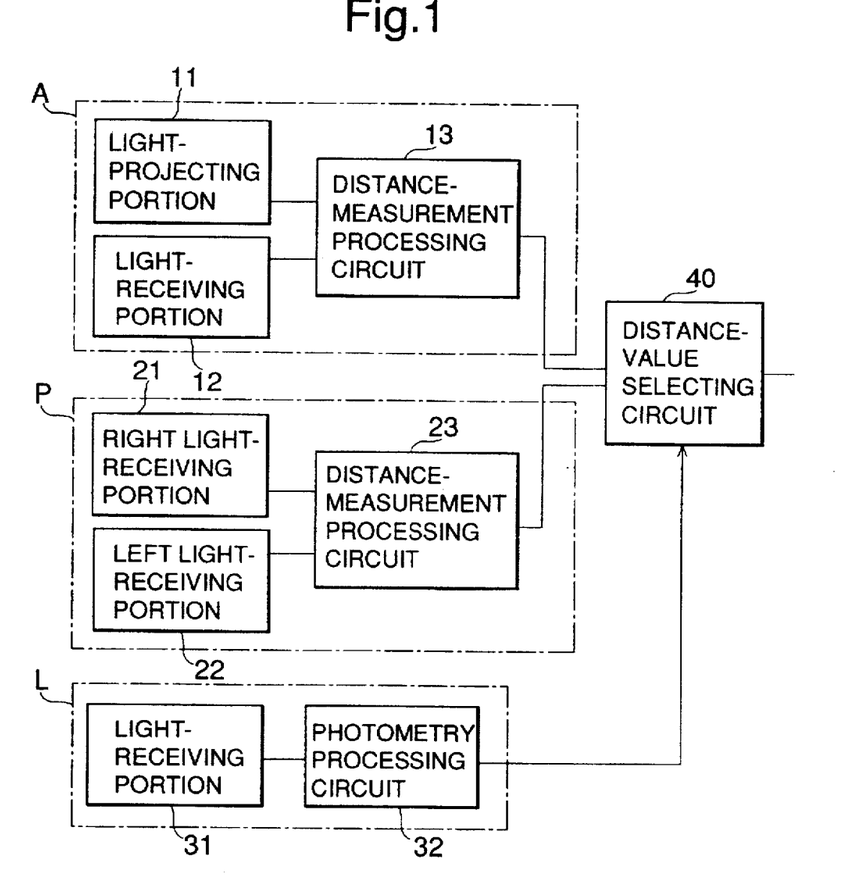
FIG. 1 is a block diagram schematically showing the arrangement of a distance measuring apparatus according to the present invention.
Figure 2:
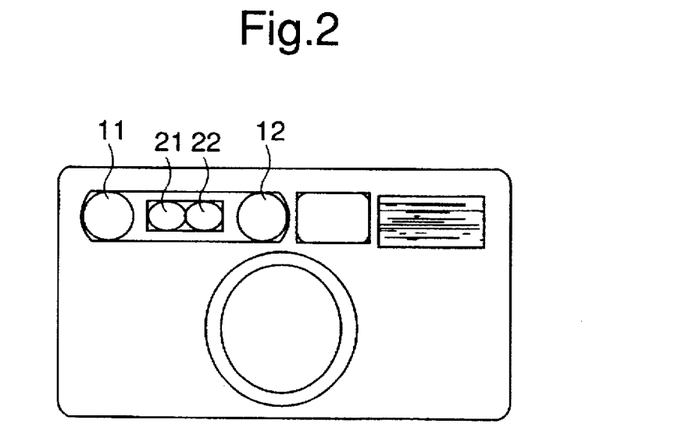
FIG. 2 is a front view showing a camera having the distance measuring apparatus according to the present invention.
Figure 3:
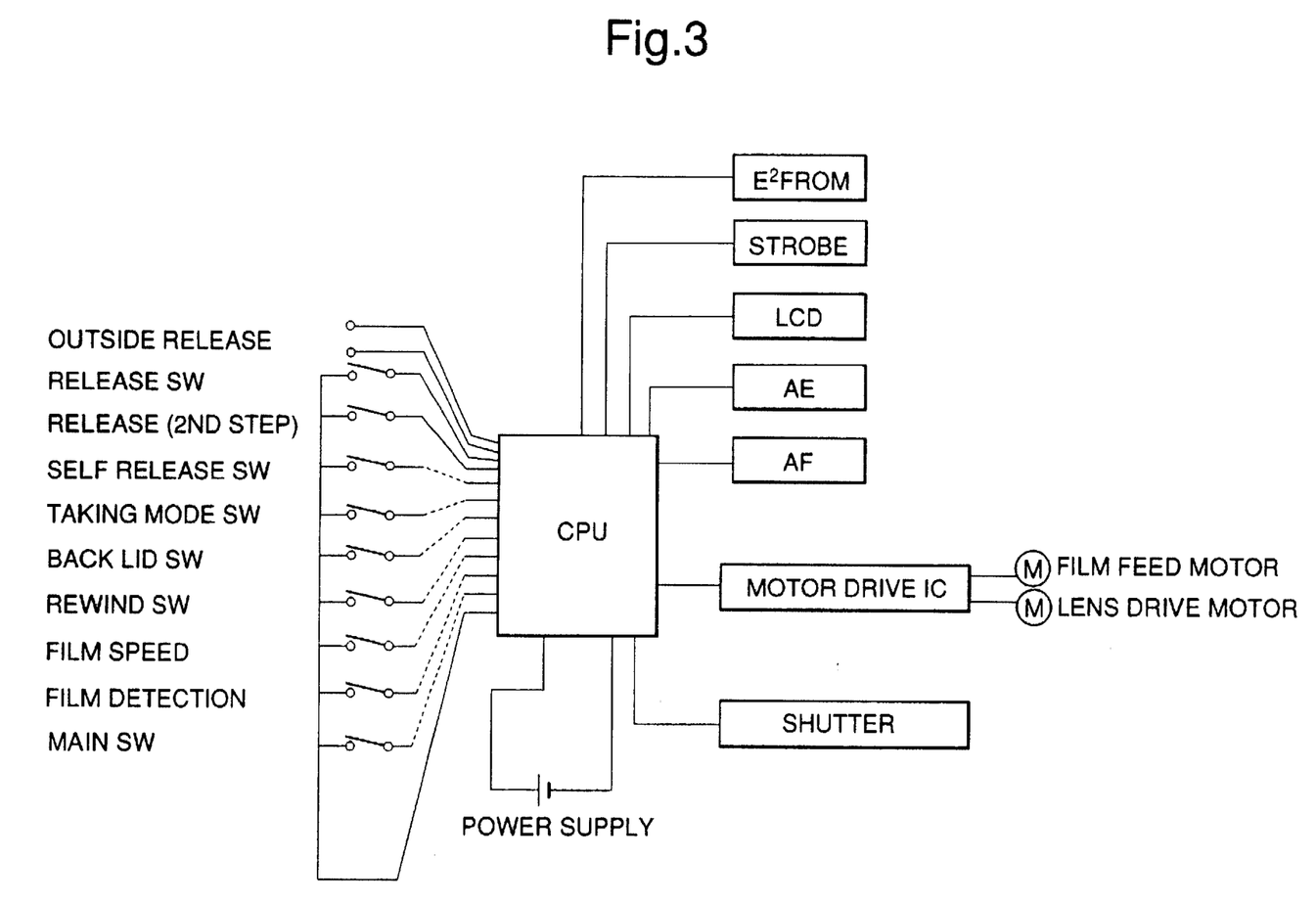
FIG. 3 is a view schematically showing the internal arrangement of the camera having the distance measuring apparatus according to the present invention.

FIG. 1 shows a schematic arrangement of a distance measuring apparatus according to Embodiment 1. FIG. 2 is a front view showing a camera having this distance measuring apparatus, and FIG. 3 is a block diagram schematically showing the internal arrangement of the camera. This distance measuring apparatus comprises an active distance measuring unit A as the first distance measuring means for executing trigonometric distance measurement of the active method, a passive distance measuring unit P as the second distance measuring means for executing trigonometric distance measurement of the passive method, a luminance determining unit L for detecting the luminance of the external field, and a distance-value selecting circuit 40 as a distance-value selecting means.

The active distance measuring unit A comprises a light-projecting portion 11 constituted by an LED or the like for projecting distance measuring light toward an object, and a light-receiving portion 12 constituted by a PSD or the like for receiving the reflected light (see FIG. 2). The active distance measuring unit A further comprises a distance-measurement processing circuit 13 for calculating the distance to the object based on the light-projecting/light-receiving result. Note that the distance measurement value obtained by the active distance measuring unit A is supplied to the distance-value selecting circuit 40.

The passive distance measuring unit P comprises right and left light-receiving portions 21 and 22 for receiving the reflected light of the natural light by the object through two optical systems (see FIG. 2). The passive distance measuring unit P further comprises light position determining units such as photodiode arrays (not shown) for receiving two optical images obtained through the light-receiving portions 21 and 22, a distance-measurement processing circuit 23 for calculating the distance to the object based on the result, and the like. Note that the distance measurement value obtained by the passive distance measuring unit P is also supplied to the distance-value selecting circuit 40.

The luminance determining unit L utilizes the arrangement of an AE portion (automatic exposure portion) in FIG. 3. The luminance determining unit L is constituted by a light-receiving element for controlling the exposure, e.g., a light-receiving portion 31 formed of a CdS or the like, a photometry processing circuit 32 for calculating the luminance of the external field based on the light-receiving result, and the like.

The distance-value selecting circuit 40 selects one of the distance measurement values measured by the respective measuring units A and P based on the luminance of the external field obtained by the luminance determining unit L and the like, and outputs it.

Note that the distance-measurement processing circuits 13 and 23, the photometry processing circuit 32, and the distance-value selecting circuit 40 are arranged within the CPU shown in FIG. 3.

The operation of this distance measuring apparatus will be described below with reference to FIG. 4.

First of all, if a release switch (see FIG. 3) is turned on with the camera facing to the object (step #100), a power supply voltage is read in to check the voltage value (steps #102 and #104). If the read voltage value does not reach a threshold value ("NO" in step #104), the flow shifts to predetermined NG processing (step #106) to inform the user of that taking processing is impossible with a display, a warning sound, or the like.

If the read voltage value reaches the threshold value ("YES" in step #104), photometry processing of detecting the luminance of the external field is performed by the luminance determining unit L (step #108), and distance measurement of the passive method is performed in the passive distance measuring unit P (step #110).

Simultaneously, a detecting means checks whether the camera is in a self-timer mode (step #112). More specifically, since the camera is set in the self-timer mode in the ON state of a self release switch in FIG. 3, it is checked whether this switch is turned on.

Note that the self-timer mode is a mode in which the opening/closing operation of a shutter is executed with the lapse of a predetermined time after the release switch is depressed.

When taking processing is to be executed in the self-timer mode, it is difficult for a person who has performed a release operation to suitably move to the center of a taking frame. In this case, a highly reliable distance measurement result can be obtained by the passive method whose distance measurement range is relatively wide.

If the ON state of the self release switch is detected ("YES" in step #112), the first distance measurement inhibiting means inhibits distance measurement processing in the active distance measuring unit A under the control of the CPU. This is because, in the self-timer mode, a person who has performed the release operation is supposed to enter the taking frame upon the release operation, and in this case it is difficult to predict movement of the main object. In this situation, distance measurement of the active method whose distance measurement range is narrow has low reliability, whereas passive distance measurement whose distance measurement range is wide has higher reliability. Therefore, when the self release switch is ON, the first selecting means of the distance-value selecting circuit 40 selects the distance measurement value of the passive distance measuring unit P (passive data) obtained in step #110 and outputs it as distance measurement data (step #114). The subsequent taking processing such as setting a taking lens based on this set distance measurement data (step #116) is executed (step #118).

On the other hand, if the detecting means detects the OFF state of the self release switch ("NO" in step #112), distance measurement of the active method is executed in the active distance measuring unit A (step #120). Both the distance measurement results of the respective distance measuring units A and P are supplied to the distance-value selecting circuit 40 through the distance-measurement processing circuits 13 and 23.

In the distance-value selecting circuit 40, a luminance check means checks whether the luminance of the external field obtained by the luminance determining unit L is at high luminance level of Lv14 or more (step #122). When the luminance of the external field is high, the light-receiving portion 12 cannot properly receive the reflected light of distance measuring light, and the distance measurement accuracy may decrease in the active method; in the passive method, the reliability of the distance measurement value is high because the light quantity of the natural light reflected by the object increases. For this reason, if the luminance of the external field obtained by the luminance determining unit L is Lv14 or more ("NO" in step #122), the distance-value selecting circuit 40 selects the distance measurement value of the passive distance measuring unit P (passive data) and outputs it as distance measurement data (step #114). The subsequent taking processing such as setting the taking lens based on the set distance measurement data (step #116) is executed based on this distance measurement value output from the distance-value selecting circuit 40 (step #118).

On the other hand, if the luminance of the external field is less than Lv14 ("YES" in step #122), it is further checked whether the luminance of the external field is as low as Lv3 or less (step #124). When the luminance of the external field is low, the reflected light quantity of the natural light is small, and the reliability is low in the passive method; in the active method, the reliability of the distance measurement value is high because the reflected light of the distance measuring light is properly detected at the light-receiving portion 12. For this reason, if the luminance of the external field obtained by the luminance determining unit L is Lv3 or less ("NO" in step #124), the distance-value selecting circuit 40 selects the distance measurement value of the active distance measuring unit A (active data) and outputs it as distance measurement data (step #126). The subsequent taking processing is executed based on this distance measurement value output from the distance-value selecting circuit 40 (steps #116 and #118).

In this manner, when the luminance check means of the distance-value selecting circuit 40 determines that the luminance of the external field is at high luminance level of Lv14 or more or at low luminance level of Lv3 or less, the distance-value selecting circuit 40 immediately selects one of the distance measurement values, as described above. When the luminance level is an intermediate luminance level of 3<Lv<14, the distance-value selecting circuit 40 determines the distance measurement value further based on the following value.

A distance-value check means of the distance-value selecting circuit 40 checks whether the distance to the object is closer than 3 m (step #128) based on the distance measurement result of the active distance measuring unit A. Since the distance measuring light is projected on the object, and the reflected light is received in the active method, there is a limit on the light-projecting distance of the distance measuring light. If the distance to the object were too far, the reflected light would be insufficient, resulting in lowering the distance measurement accuracy or disabling the distance measurement. Thus, if the distance measurement result of the active distance measuring unit A shows by the distance-value check means of the distance-value selecting circuit 40 that the object is closer than 3 m ("YES" in step #128), the distance-value selecting circuit 40 selects the distance measurement value of the active distance measuring unit A (active data) having higher reliability, and outputs it as distance measurement data (step #126). The subsequent taking processing is executed based on this distance measurement value output from the distance-value selecting circuit 40 (steps #116 and #118).

On the other hand, if the distance measurement result of the active distance measuring unit A shows that the object is as far as 3 m or more ("NO" in step #128), the distance-value selecting circuit 40 selects the distance measurement value of the passive distance measuring unit P (passive data) and outputs it as distance measurement data (step #114). The subsequent taking processing is executed based on the distance measurement value output from the distance-value selecting circuit 40 (steps #116 and #118).

In the distance measuring apparatus of this embodiment, first of all, it is checked whether the camera is in the self-timer mode, and if "YES", the distance measurement value of the passive distance measuring unit P whose distance measurement range is wide is selected; if the camera is in a normal taking mode, a highly reliable distance measurement value of the distance measurement values obtained by the respective distance measuring units A and P can be selected.

Figure 4:
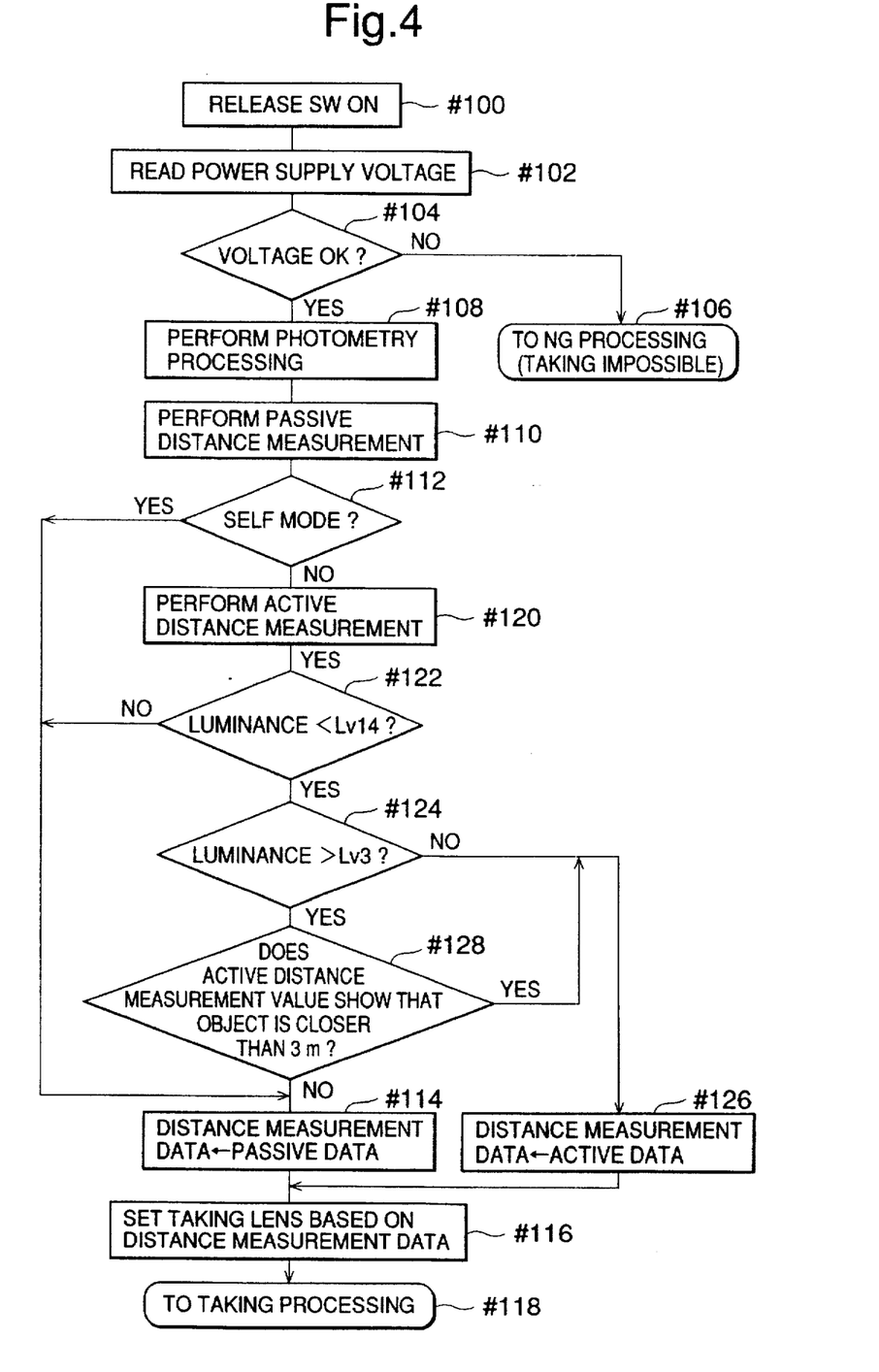
FIG. 4 is a flow chart showing the operation of the distance measuring apparatus according to Embodiment 1 of the present invention.
Figure 5:
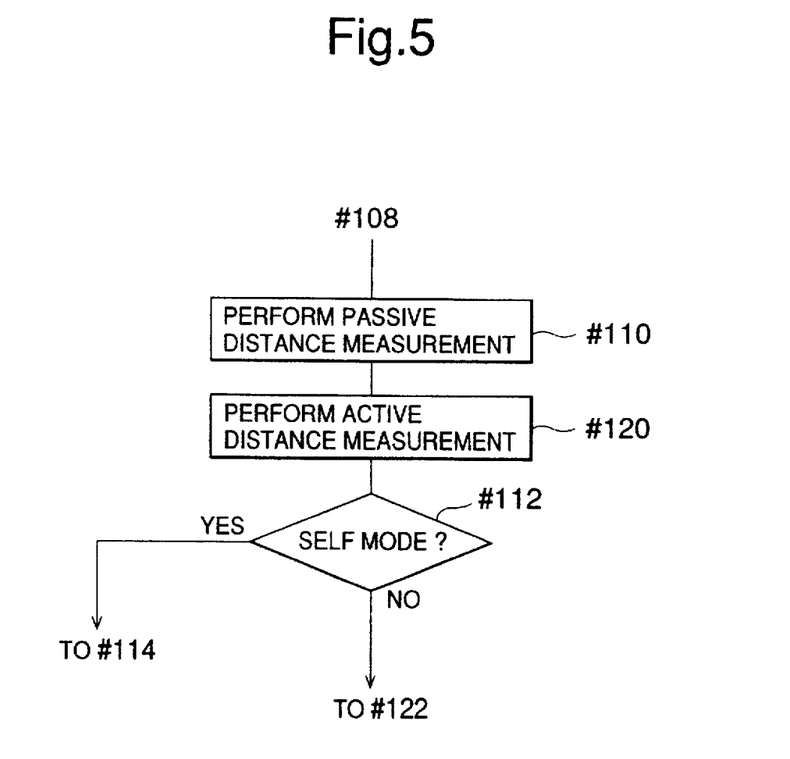
FIG. 5 is a flow chart showing a modification of the operation of the distance measuring apparatus shown in FIG. 4.

In addition, the flow chart shown in FIG. 4 exemplifies the case of inhibiting distance measurement processing of the active distance measuring unit A when the self-timer mode is set. However, when distance measurement is executed by both the active and passive distance measuring units A and P, and it is determined that the camera is in the self-timer mode, the distance-value selecting circuit 40 can select the distance measurement result of the passive distance measuring unit P. Note that, as a flow chart in this case, only a flow changed from the flow chart in FIG. 4 is extracted and shown in FIG. 5.

Embodiment 2

Figure 6:
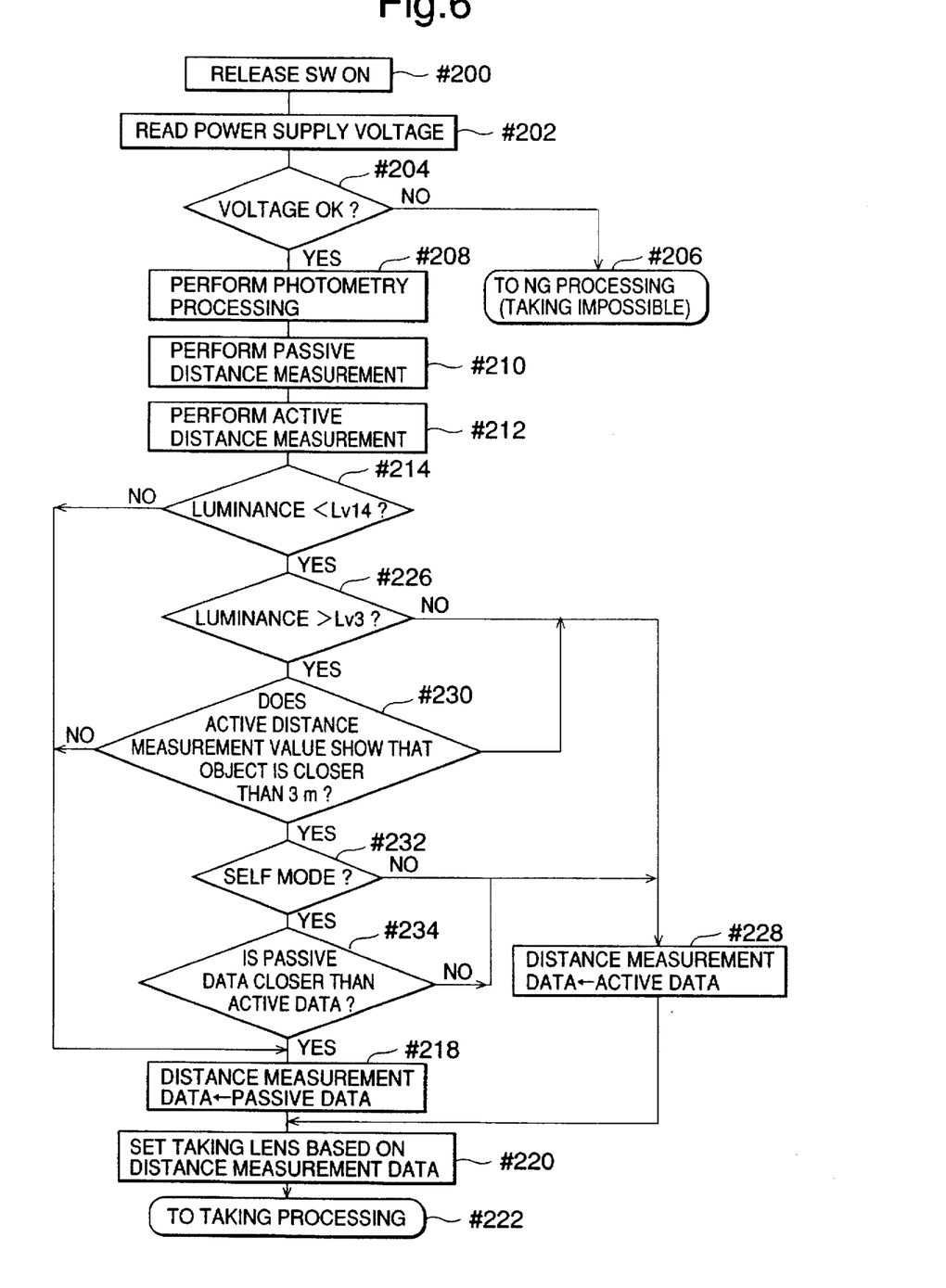
FIG. 6 is a flow chart showing the operation of the distance measuring apparatus according to Embodiment 2 of the present invention.

A distance measuring apparatus according to Embodiment 2 will be described based on a flow chart in FIG. 6.

Steps #200 to #208 in this flow are the same as steps #100 to #108 in FIG. 4, and passive distance measurement and active distance measurement are executed subsequent to these steps (steps #210 and #212).

The luminance of the external field is determined similarly in steps #122 and #124, and if the luminance of the external field is Lv14 or more ("NO" in step #214), a distance-value selecting circuit 40 selects the distance measurement value of a passive distance measuring unit P (passive data) and outputs it as distance measurement data (step #218). The subsequent taking processing is executed based on this distance measurement value output from the distance-value selecting circuit 40 (steps #220 and #222).

On the other hand, if the luminance of the external field is less than Lv14 ("YES" in step #214), it is further checked whether the luminance of the external field is as low as Lv3 or less (step #226). When the luminance of the external field is Lv3 or less ("NO" in step #226), the distance-value selecting circuit 40 selects the distance measurement value of an active distance measuring unit A (active data) and outputs it as distance measurement data (step #228). The subsequent taking processing is executed based on this distance measurement value output from the distance-value selecting circuit 40 (steps #220 and #222).

When the luminance level is an intermediate luminance level of 3<Lv<14 ("YES" in step #226), it is checked whether the distance measurement result by the active distance measuring unit A shows that the object is closer than 3 m (step #230). If the distance measurement result by the active distance measuring unit A shows that the object is as far as 3 m or more ("NO" in step #230), the distance-value selecting circuit 40 selects the distance measurement value of the passive distance measuring unit P (passive data) and outputs it as distance measurement data (step #218).

If the distance measurement result by the active distance measuring unit A shows that the object is closer than 3 m ("YES" in step #230), it is checked next whether the camera is in the self-timer mode (step #232). If the camera is in the normal taking mode, the distance-value selecting circuit 40 selects the distance measurement value of the active distance measuring unit A (step #228), like in the flow of FIG. 4. The subsequent taking processing is executed based on this distance measurement value (steps #220 and #222).

If it is determined in step #232 that the camera is in the self-timer mode ("YES" in step #233), the second selecting means checks whether the passive data is a closer value than the active data (step #234). In other words, the second selecting means checks which of the distance measurement results indicates a closer distance. This is because, when taking processing is executed in the self-timer mode, a person is often taken with a desired scene as its background, and the main cause of erroneous distance measurement occurring in this case is focusing of not a main object such as a person but its background side. For this reason, of the obtained distance measurement results, the distance measurement value indicating a closer distance is selected as an effective distance measurement result.

If the passive data indicates a closer distance in step #234 ("YES" in step #234), this passive data is selected as distance measurement data (step #218). If the active data indicates a closer distance ("NO" in step #234), this active data is selected as distance measurement data (step #228). In either case, the subsequent taking processing is executed based on the selected distance measurement data (steps #220 and #222).

Embodiment 2 described above exemplifies the case of detecting the luminance of the external field by a luminance determining unit L. In addition to this, the luminance of the external field can be obtained by a photometry/distance-measurement processing circuit 24 based on the light-receiving results of respective light-receiving portions 21 and 22 in the passive distance measuring unit P.

As described above, in the distance measuring apparatus, a detecting means detects that the self-timer mode is set, and the first distance measurement inhibiting means inhibits distance measurement processing by the first distance measuring means of the active method, or the first selecting means selects the distance measurement result of the second distance measuring means. Therefore, even when taking processing is executed in the self-timer mode, erroneous distance measurement can be prevented, and a highly reliable distance measurement can be obtained.

In addition, the second selecting means selects a highly reliable distance measurement result of distance measurement results of the first and second distance measuring means from the second distance measuring means of the passive method is selected.

Further in the distance measuring apparatus, when the self-timer mode is set, the second selecting means selects a distance measurement value indicating a closer distance. Therefore, the inconvenience of focusing of the background of a main object such as a person, which occurs in taking processing in this mode, can be eliminated, and a highly reliable distance measurement result can be obtained. More specifically, when taking processing is executed in the self-timer mode in this manner, a person are often taken with a desired scene as its background. The main cause of erroneous distance measurement occurring in this case is focusing of not a main object such as a person but its background side. For this reason, distance measurement is performed by the two types of methods described above, and of the obtained distance measurement results, a distance measurement value indicating a closer distance is supposed to be the distance measurement value to the main object such as a person. The second selecting means selects this distance measurement value as an effective distance measurement value.

Embodiment 3

Since the schematic arrangement of a distance measuring apparatus according to Embodiment 3, a camera having this distance measuring apparatus, and the like are the same as those in Embodiment 1, FIGS. 1 to 3 apply to Embodiment 3. The operation of the distance measuring apparatus according to Embodiment 3 will be described based on FIG. 8.

Figure 8:
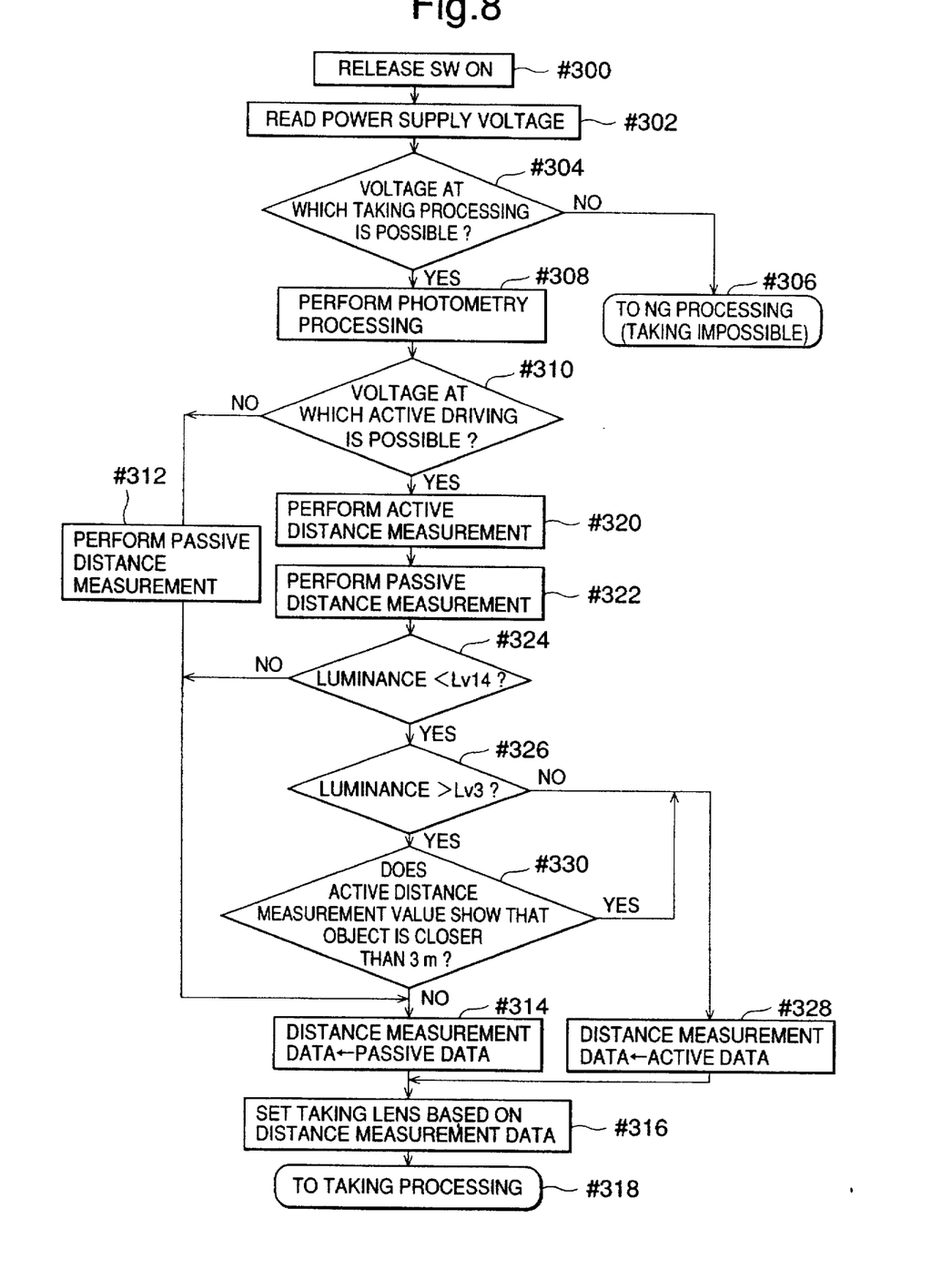
FIG. 8 is a flow chart showing the operation of the distance measuring apparatus according to Embodiment 3 of the present invention.

First of all, if a release switch (not shown) is turned on with the camera facing to the object (step #300), a power supply voltage is read in the CPU to check the voltage value (steps #302 and #304). In the camera having two lithium batteries as a power supply, whose nominal power supply voltage is 6 V, if the read power supply voltage is 3.8 V or more, it is determined that taking processing is possible. Therefore, if the read power supply voltage value is less than 3.8 V ("NO" in step #304), the flow shifts to predetermined NG processing (step #306) to inform the user that taking processing is impossible with a display, a warning sound, or the like.

If the read power supply voltage value is 3.8 V or more ("YES" in step #304), photometry processing of detecting the luminance of the external field is performed by a luminance determining unit L (step #308).

Then, it is checked whether distance measurement of the active method is possible (step #310). More specifically, for example, when the nominal power supply voltage is 6 V, if the power supply voltage is 4.3 V or more, it is determined that distance measurement of the active method is possible. For example, when the detected power supply voltage is 4.0 V, taking processing is possible because the power supply voltage satisfies the condition of 3.8 V or more. However, for example, when the object is positioned far from the camera, a light-projecting portion 11 for active distance measurement may not receive a sufficient current. For this reason, the power supply voltage at which active distance measurement can be reliably executed is set at 4.3 V or more. If it is determined that the power supply voltage is less than 4.3 V in step #310 ("NO" in step #310), only a passive distance measuring unit P is driven, and distance measurement processing of an active distance measuring unit A is inhibited under the control of the CPU (step #312). A distance-value selecting circuit 40 outputs the distance measurement result of the passive distance measuring unit P (passive data) as distance measurement data (step #314). The subsequent taking processing such as setting the taking lens based on the set distance measurement data is executed based on this distance measurement value output from the distance-value selecting circuit 40 (step #318).

On the other hand, if the read power supply voltage is 4.3 V or more ("YES" in step #310), distance measurement of the active and passive methods are performed in the active and passive distance measuring units A and P, respectively (steps #320 and #322). Both the distance measurement results of the respective distance measuring units A and P are supplied to the distance-value selecting circuit 40 through distance-measurement processing circuits 13 and 23.

The distance-value selecting circuit 40 checks whether the luminance of the external field obtained by the luminance determining unit L is at high luminance level of Lv14 or more (step #324). When the luminance of the external field is high, a light-receiving portion 12 cannot properly receive the reflected light of distance measuring light, and the distance measurement accuracy may decrease in the active method; in the passive method, the reliability of the distance measurement value is high because the light quantity of the natural light reflected by the object increases. For this reason, when the luminance of the external field obtained by the luminance determining unit L is Lv14 or more ("NO" in step #324), the distance-value selecting circuit 40 selects the distance measurement value of the passive distance measuring unit P (passive data) and outputs it as distance measurement data (step #314). The subsequent taking processing such as setting the taking lens based on the set distance measurement data (step #316) is executed based on this distance measurement value output from the distance-value selecting circuit 40 (step #318).

On the other hand, when the luminance of the external field is less than Lv14 ("YES" in step #324), it is further checked whether the luminance of the external field is as low as Lv3 or less (step #326). When the luminance of the external field is low, the reflected light quantity of the natural light is small, and the reliability is low in the passive method; in the active method, the reliability of the distance measurement value is high because the reflected light of the distance measuring light is properly detected at the light-receiving portion 12. For this reason, when the luminance of the external field obtained by the luminance determining unit L is Lv3 or less ("NO" in step #326), the distance-value selecting circuit 40 selects the distance measurement value of the active distance measuring unit A (active data) and outputs it as distance measurement data (step #328). The subsequent taking processing is executed based on this distance measurement value output from the distance-value selecting circuit 40 (steps #316 and #318).

In this manner, when the luminance of the external field is at high luminance level of Lv14 or more or at low luminance level of Lv3 or less, the distance-value selecting circuit 40 immediately selects one of the distance measurement values, as described above.

When the luminance level is an intermediate luminance level of 3<Lv<14 ("YES" in step #326), the distance-value selecting circuit 40 determines the distance measurement value further based on the following value.

The distance-value selecting circuit 40 checks whether the distance to the object is closer than 3 m (step #330) based on the distance measurement result of the active distance measuring unit A. Since the distance measuring light is projected on the object, and the reflected light is received in the active method, there is a limit on the light-projecting distance of the distance measuring light. If the distance to the object were too far, the reflected light would be insufficient, resulting in lowering the distance measurement accuracy or disabling the distance measurement. Thus, if the distance measurement result of the active distance measuring unit A shows that the object is closer than 3 m ("YES" in step #330), the distance-value selecting circuit 40 selects the distance measurement value of the active distance measuring unit A (active data) having higher reliability, and outputs it as distance measurement data (step #328). The subsequent taking processing is executed based on this distance measurement value output from the distance-value selecting circuit 40 (steps #316 and #318).

On the other hand, if the distance measurement result of the active distance measuring unit A shows that the object is as far as 3 m or more ("NO" in step #330), the distance-value selecting circuit 40 selects the distance measurement value of the passive distance measuring unit P (passive data) and outputs it as distance measurement data (step #314). The subsequent taking processing is executed based on the distance measurement value output from the distance-value selecting circuit 40 (steps #316 and #318).

In this manner, in the distance measuring apparatus according to this embodiment, it is checked based on the power supply voltage in taking processing whether active distance measurement can be driven, and if the active distance measurement cannot be driven, only passive distance measurement is executed; if it can be driven, distance measurement is executed by both the active and passive distance measuring units A and P, a higher reliable distance measurement value of the obtained distance measurement values is selected as a proper distance measurement value. Accordingly, a high distance measurement accuracy can always be obtained.

The flow chart described above exemplifies the case of inhibiting active distance measurement when the active distance measurement cannot be driven. In addition, when the power supply voltage after execution of distance measurement by both the active and passive distance measuring units A and P is determined to show that the active distance measurement cannot be driven, the distance-value selecting circuit 40 may select the distance measurement result of the passive distance measuring unit P. Note that a flow chart in this case does not require step #312 in FIG. 8 if "NO" in step #310, and only a flow changed from the flow chart in FIG. 8 is extracted and shown in FIG. 9.

Figure 9:
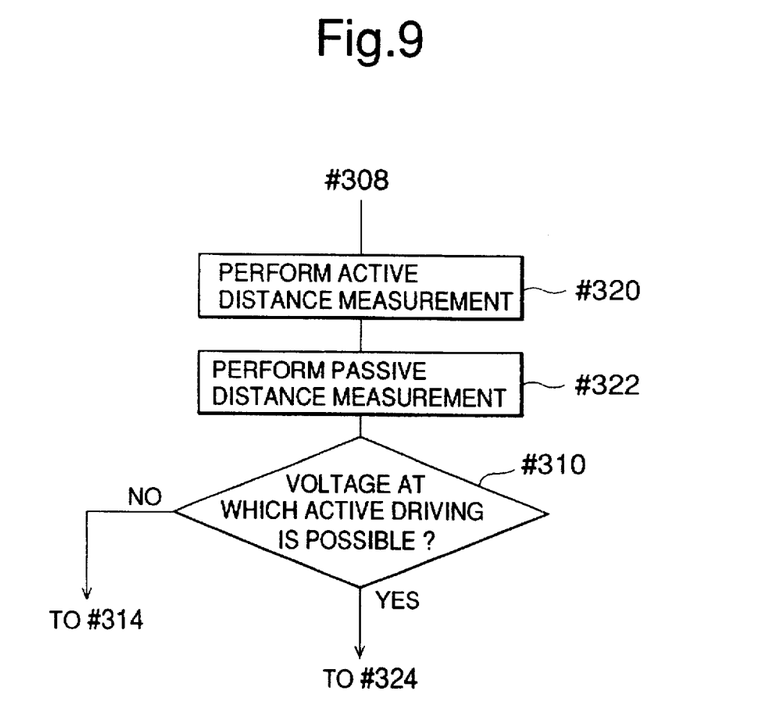
FIG. 9 is a flow chart showing a modification of the operation of the distance measuring apparatus shown in FIG. 8.

In either flow chart, the order of steps #320 and #322 is not important, and they may be executed simultaneously.

Further in the above embodiment, the power supply voltage value at taking processing is possible, and the power supply voltage value at which active distance measurement can be driven are not limited to the above-described values, and may be properly set in accordance with the nominal voltage of a power supply to be incorporated in the camera, the light-emission performance of the light-projecting portion 11, and the like.

Figure 7:
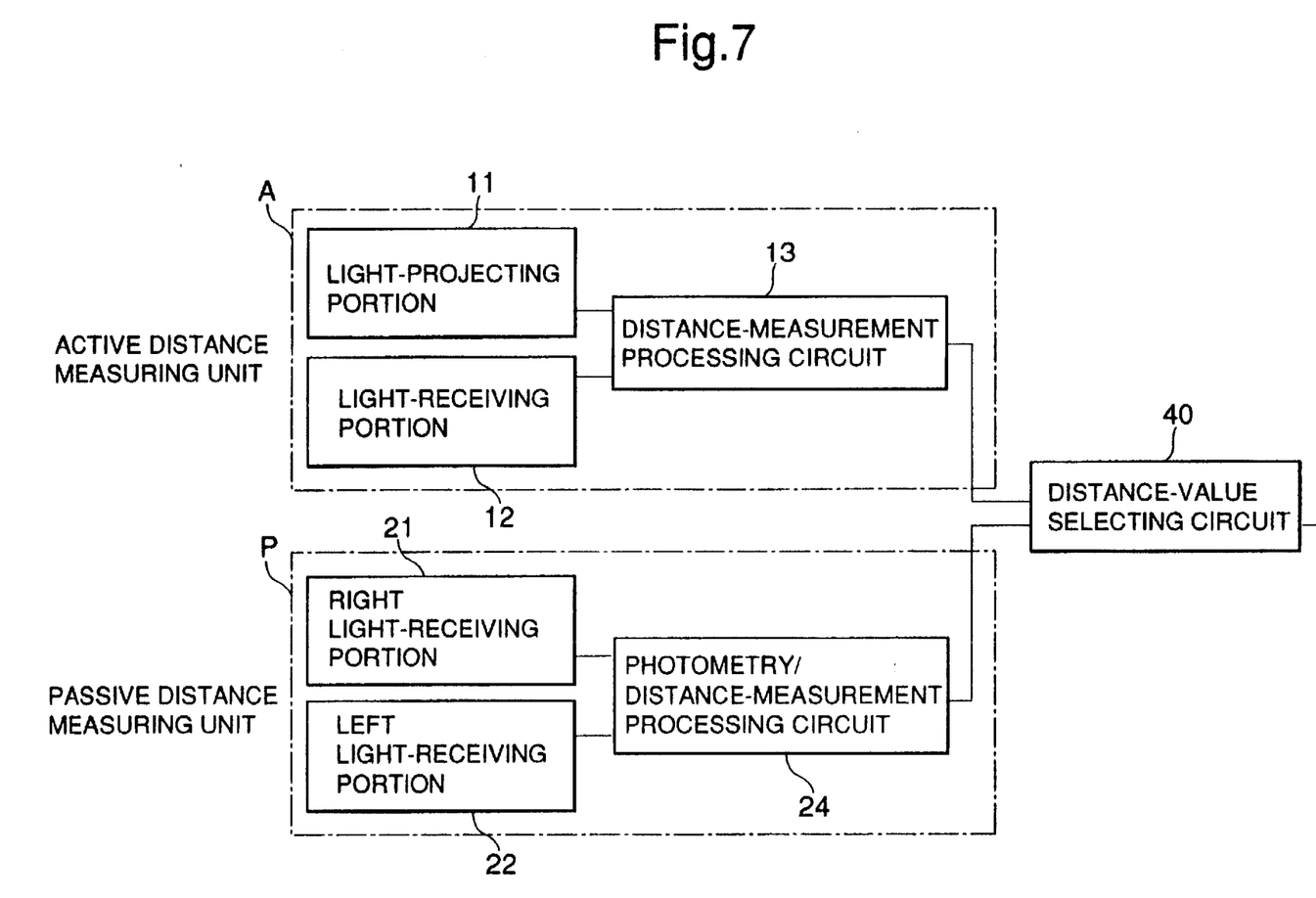
FIG. 7 is a block diagram showing another arrangement of the distance measuring apparatus according to the present invention.

The above embodiment exemplifies the case of detecting the luminance of the external field by the luminance determining unit L. In addition to this, the luminance of the external field can be obtained by a photometry/distance-measurement processing circuit 24 based on the light-receiving results of respective light-receiving portions 21 and 22 in the passive distance measuring unit P, as shown in FIG. 7.

As described above, in the distance measuring apparatus according to Embodiment 3, if a comparing means determines that the power supply voltage cannot properly execute active distance measurement, the second distance measurement inhibiting means can inhibit distance measurement of the active method, or the third selecting means can select the distance measurement result of passive distance measurement. Moreover, when the power supply voltage is a voltage at which taking processing is possible, but a light-emitting element for active distance measurement may not receive a sufficient current, passive distance measurement can be executed, resulting in sufficiently suppressing occurrence of erroneous distance measurement.

Embodiment 4

Since the schematic arrangement of a distance measuring apparatus according to Embodiment 4, a camera having this distance measuring apparatus, and the like are the same as those in Embodiment 1, FIGS. 1 to 3 apply to Embodiment 4. The operation of the distance measuring apparatus according to Embodiment 4 will be described based on FIG. 10.

Figure 10:
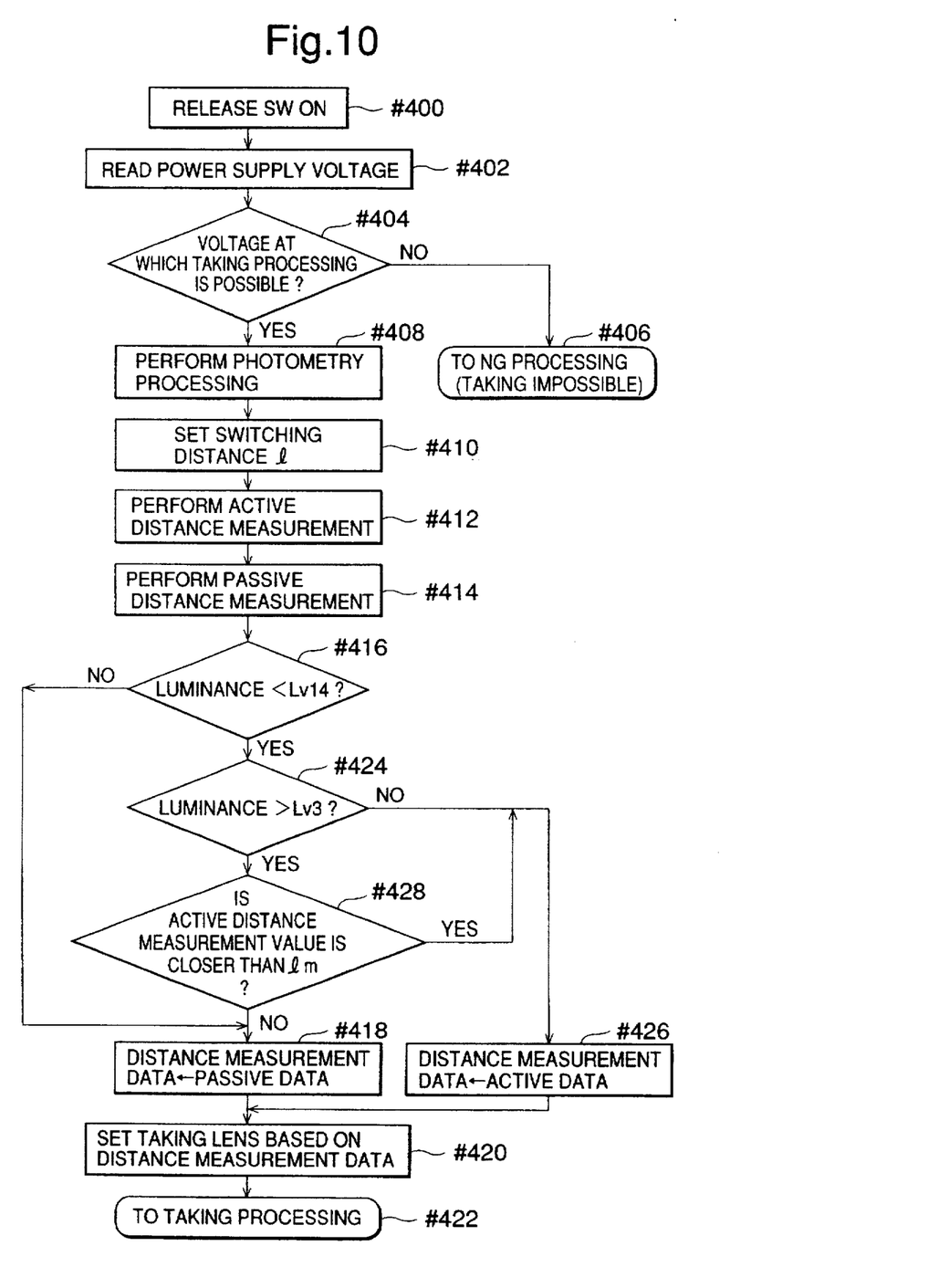
FIG. 10 is a flow chart showing the operation of the distance measuring apparatus according to Embodiment 4 of the present invention.

First of all, if a release switch (not shown) is turned on with the camera facing to the object (step #400), a power supply voltage is read in the CPU to check the voltage value (steps #402 and #404). In the camera having two lithium batteries as a power supply, whose nominal power supply voltage is 6 V, if the read power supply voltage is 3.8 V or more, it is determined that taking processing is possible. Therefore, if the read power supply voltage value is less than 3.8 V ("NO" in step #404), the flow shifts to predetermined NG processing (step #406) to inform the user that taking processing is impossible with a display, a warning sound, or the like.

If the read power supply voltage value is 3.8 V or more ("YES" in step #404), photometry processing of detecting the luminance of the external field is performed by a luminance determining unit L (step #408).

In step #410, a distance measurement range wherein distance measurement of the active method can be properly executed is set based on the power supply voltage value read in step #402. In the active method, a light-emitting element at a light-projecting portion 11 emits light toward the object.

To obtain a large light-emitting quantity, a large current must be supplied from the power supply. However, the light-emitting element at the light-projecting portion 11 may not emit light in an proper light quantity because the power supply voltage decreases in use. Therefore, in step #404, a setting means sets a distance measurement range wherein distance measurement of the active method can be properly executed, based on the power supply voltage read in step #402. In this case, a correspondence table like Table 1 below is stored in advance in a memory in the CPU, and a corresponding distance measurement range (switching distance l) is retrieved from this correspondence table based on the power supply voltage read in step #402. The retrieved value is set (step #410) as a value e in a determining block in step #428 (to be described later).

TABLE 1

| Power Supply Voltage | Switching Distance l |
| --- | --- |
| Less than 4.0 V | 0 m (not use "active") |
| 4.0 V to 4.5 V | 2.85 m |
| 4.5 V to 5.0 V | 3.33 m |
| 5.0 V to 5.5 V | 4.00 m |
| 5.5 V to 6.0 V | 5.00 m |
| 6.0 V or more | 6.66 m |

From Table 1, when the power supply voltage is, e.g., 4.6 V, the switching distance l is 3.33 m, and this value is set as the value l in step #428.

In this manner, upon setting of the switching distance l, distance measurement of the active method is performed in an active distance measuring unit, and at the same time distance measurement of the passive method is performed in a passive distance measuring unit P (steps #412 and #414). Both the distance measurement results in a measuring unit A and the measuring unit P are supplied to a distance-value selecting circuit 40 through distance-measurement processing circuits 13 and 23.

Note that, when the power supply voltage is, e.g., 3.9 V, taking processing is executed because the power supply voltage satisfies the condition of 3.8 V or more at which taking processing is possible. In this case, however, since sufficient light-emitting quantity cannot be obtained, active distance measurement is not executed, and only passive distance measurement is executed.

The distance-value selecting circuit 40 checks whether the luminance of the external field obtained by the luminance determining unit L is at high luminance level of Lv14 or more (step #416). When the luminance of the external field is high, a light-receiving portion 12 cannot properly receive the reflected light of distance measuring light, and the distance measurement accuracy may decrease in the active method; in the passive method, the reliability of the distance measurement value is high because the light quantity of the natural light reflected by the object increases. For this reason, when the luminance of the external field obtained by the luminance determining unit L is Lv14 or more ("NO" in step #416), the first check means of the distance-value selecting circuit 40 selects the distance measurement value of the passive distance measuring unit P (passive data) and outputs it as distance measurement data (step #418). The subsequent taking processing such as setting the taking lens based on the set distance measurement data (step #420) is executed based on this distance measurement value output from the distance-value selecting circuit 40 (step #422).

On the other hand, when the luminance of the external field is less than Lv14 ("YES" in step #416), it is further checked whether the luminance of the external field is as low as Lv3 or less (step #424). When the luminance of the external field is low, the reflected light quantity of the natural light is small, and the reliability is low in the passive method; in the active method, the reliability of the distance measurement value is high because the reflected light of the distance measuring light is properly detected at the light-receiving portion 12. For this reason, when the luminance of the external field obtained by the luminance determining unit L is Lv3 or less ("NO" in step #424), the second check means of the distance-value selecting circuit 40 selects the distance measurement value of the active distance measuring unit A (active data) and outputs it as distance measurement data (step #426). The subsequent taking processing is executed based on this distance measurement value output from the distance-value selecting circuit 40 (steps #420 and #422).

In this manner, when the luminance of the external field is at high luminance level of Lv14 or more or at low luminance level of Lv3 or less, the distance-value selecting circuit 40 immediately selects one of the distance measurement values, as described above.

When the luminance level is an intermediate luminance level of 3<Lv<14 ("YES" in step #424), the distance-value selecting circuit 40 determines the distance measurement value further based on the following value.

The distance-value selecting circuit 40 checks whether the distance measurement value obtained by the active distance measuring unit A is smaller than the switching distance 1 m set in step #410 (step #428). Under conditions that allow "YES" in step #424, distance measurement can be effectively performed by both the active and passive methods. However, when the distance measurement result of the active distance measuring unit A is smaller than the set switching distance P m, distance measurement of the active method can be properly executed in this range. In addition, when the distance to the object is so short, the distance measurement result of the active method has higher reliability than that of the passive method. For this reason, when the distance measurement result of the active distance measuring unit A is smaller than the switching distance e m ("YES" in step #428), the third check means of the distance-value selecting circuit 40 selects the distance measurement value of the active distance measuring unit A (active data) having higher reliability, and outputs it as distance measurement data (step #426). The subsequent taking processing is executed based on this distance measurement value output from the distance-value selecting circuit 40 (steps #420 and #422).

On the other hand, when the distance measurement result of the active distance measuring unit A is larger than the switching distance 1 m ("NO" in step #428), the distance-value selecting circuit 40 selects the distance measurement value of the passive distance measuring unit P (passive data) and outputs it as distance measurement data (step #418). The subsequent taking processing is executed based on this distance measurement value (steps #420 and #422).

In this manner, in the distance measuring apparatus according to this embodiment, the distance measurement range wherein active distance measurement is possible is preset., distance measurement is executed by both the active and passive distance measuring units A and P, and of the obtained distance measurement values, a distance measurement value having higher reliability is selected as a proper distance measurement value. Therefore, distance measurement can always be performed with high accuracy.

Note that the above flow chart exemplifies the case in which, when the distance measurement result of the active distance measuring unit A is smaller than the switching distance 1 m in step #428, the flow advances to step #426 to select the distance measurement value of the active distance measuring unit A. Alternatively, if "YES" in step #428, the following processing may be executed. More specifically, in this situation, it is difficult to check which of the distance measurement results of the methods is more accurate. In this case, the average value between the distance measurement values of the active and passive distance measuring units A and P is used as an obtained distance measurement result. In this manner, the distance measurement results obtained by both the methods are averaged, and the average value is used as a distance measurement value, thereby obtaining high distance measurement accuracy. When the averaged distance measurement value is obtained, this result is output from the distance-value selecting circuit 40, and the subsequent taking processing is executed based on this distance measurement value (steps #420 and #422).

The flow chart described above exemplifies the case of retrieving the switching distance P from Table 1 as the correspondence table in step #410. In addition to this, the switching distance 1 may be calculated based on a read power supply voltage V in accordance with the following calculation or the like:

$$l = 1/(0.8 - 0.1 \times V)$$

l: distance (m), V: read power supply voltage (V)

The order of distance measurement processing in the active and passive distance measuring units A and P is not important, and they may be executed simultaneously.

Further in the above embodiment, the power supply voltage value at which taking processing is possible, the value of the switching distance 1 m, and the like are not limited to the above-described values, and may be properly set in accordance with the light-emission performance of the light-projecting portion 11, and the like.

The above embodiment exemplifies the case of detecting the luminance of the external field by the luminance determining unit L. In addition to this, the luminance of the external field can be obtained by a photometry/distance-measurement processing circuit 24 based on the light-receiving results of respective light-receiving portions 21 and 22 in the passive distance measuring unit P, as shown in FIG. 7.

As described above, in the distance measuring apparatus according to Embodiment 4, distance measurement is executed by both distance measuring means of the passive and active methods, and a distance-value selecting means can select distance measurement having higher reliability. With a setting means, the distance measurement range wherein the first distance measuring means of the active method can properly operate can be set in accordance with an output voltage from a power supply means. Therefore, active distance measurement can be performed under conditions that allow a light-emitting element for active distance measurement to always receive a sufficient current, resulting in sufficiently suppressing occurrence of erroneous distance measurement.

In addition, since the third check means checks whether the luminance of the external field is a value smaller than a predetermined intermediate level, it can be checked whether the situation is suitable for properly executing distance measurement by both the methods. Accordingly, a distance measurement result having higher reliability can be obtained.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No.149141/1995, No.149144/1995 and No.149151/1995 all filed on Jun. 15, 1995 are hereby incorporated by reference.

What is claimed is:

1. A distance measuring apparatus comprising:

first distance measuring means of an active method for projecting distance measuring light on an object to calculate a distance to the object based on a condensed position of reflected light reflected by the object;

second distance measuring means of a passive method for receiving natural light reflected by the object through two optical systems to calculate the distance to the object based on two optical images obtained through the respective optical systems;

distance value selecting means for selecting and outputting distance measurement results obtained by one of said first and second distance measuring means; and detecting means for detecting setting of a self-timer mode, wherein said distance-value selecting means further comprises first distance measurement inhibiting means for inhibiting distance measurement processing of said first distance measuring means when said detecting means detects setting of the self-timer mode.

2. A distance measuring apparatus comprising:

first distance measuring means of an active method for projecting distance measuring light on an object to calculate a distance to the object based on a condensed position of reflected light reflected by the object;

second distance measuring means of a passive method for receiving natural light reflected by the object through two optical systems to calculate the distance to the object based on two optical images obtained through the respective optical systems;

distance value selecting means for selecting and outputting distance measurement results obtained by one of said first and second distance measuring means, wherein said distance-value selecting means further comprises selecting means for selecting the distance measurement result of said second distance measuring means when said detecting means detects setting of the self-timer mode; and detecting means for detecting setting of a self-timer mode.

3. A distance measuring apparatus comprising:

first distance measuring means of an active method for projecting distance measuring light on an object to calculate a distance to the object based on a condensed position of reflected light reflected by the object;

second distance measuring means of a passive method for receiving natural light reflected by the object through two optical systems to calculate the distance to the object based on two optical images obtained through the respective optical systems;

distance value selecting means for selecting and outputting distance measurement results obtained by one of said first and second distance measuring means wherein said distance-value selecting means further comprises selecting means for selecting, of the distance measurement results of said first and second distance measuring means, a distance measurement value indicating a closer distance when said detecting means detects setting of the self-timer mode; and detecting means for detecting setting of a self-timer mode.

4. A distance measuring apparatus comprising:

first distance measuring means of an active method for protecting distance measuring light on an object to calculate a distance to the object based on a condensed position of reflected light reflected by the object;

second distance measuring means of a passive method for receiving natural light reflected by the object through two optical systems to calculate the distance to the object based on two optical images obtained through said respective optical system;

distance value selecting means for selecting and outputting one of distance measurement results obtained by said first and second distance measuring means;

detecting means for detecting setting of a self-timer mode; and luminance determining means for detecting a luminance of an external field.

5. An apparatus according to claim 4, further comprising luminance check means for selecting one of distance measurement values of said first and second distance measuring means in accordance with whether the luminance of the external field obtained by said luminance determining means is larger or smaller than a predetermined value.

6. A distance measuring apparatus comprising:

first distance measuring means of an active method for projecting distance measuring light on an object to calculate a distance to the object based on a condensed position of reflected light reflected by the object;

second distance measuring means of a passive method for receiving natural light reflected by the object through two optical systems to calculate the distance to the object based on two optical images obtained through said respective optical system;

distance value selecting means for selecting and outputting one of distance measurement results obtained by said first and second distance measuring means;

detecting means for detecting setting of a self-timer mode; and distance-value check means for selecting one of distance measurement values of said first and second distance measuring means in accordance with whether the distance measurement result by said first distance measuring means is larger or smaller than a predetermined value.

7. A distance measuring apparatus comprising:

first distance measuring means of an active method for projecting distance measuring light on an object to calculate a distance to the object based on a condensed position of reflected light reflected by the object, second distance measuring means of a passive method for receiving natural light reflected by the object through two optical systems to calculate the distance to the object based on two optical images obtained through said respective optical systems;

distance-value selecting means for selecting and outputting one of distance measurement results obtained by said first and second distance measuring means;

power supply means for supplying a current to said first and second distance measuring means and said distance-value selecting means; and detecting means for detecting an output voltage from said power supply means, wherein said distance-value selecting means comprises comparing means for comparing a predetermined power supply voltage value at which distance measurement can be properly executed by said first distance measuring means with the voltage value detected by said detecting means and distance measurement inhibiting means for inhibiting distance measurement of said first distance measurement means when the voltage value detected by said detecting means is smaller than the predetermined power supply voltage value based on a comparison result of said comparing means.

8. A distance measuring apparatus comprising:

first distance measuring means of an active method for projecting distance measuring light on an object to calculate a distance to the object based on a condensed position of reflected light reflected by the object;

second distance measuring means of a passive method for receiving natural light reflected by the object through two optical systems to calculate the distance to the object based on two optical images obtained through said respective optical systems;

distance-value selecting means for selecting and outputting one of distance measurement results obtained by said first and second distance measuring means;

power supply means for supplying a current to said first and second distance measuring means and said distance-value selecting means; and detecting means for detecting an output voltage from said power supply means, wherein said distance-value selecting means comprises comparing means for comparing a predetermined power supply voltage value at which distance measurement can be properly executed by said first distance measuring means with the voltage value detected by said detecting means and selecting means for selecting the distance measurement result of said second distance measuring means when the voltage value detected by detecting means is smaller than the predetermined power supply voltage value based on a comparison result of said comparing means.

9. A distance measuring apparatus comprising:

first distance measuring means of an active method for projecting distance measuring light on an object to calculate a distance to the object based on a condensed position of reflected light reflected by the object;

second distance measuring means of a passive method for receiving natural light reflected by the object through two optical systems to calculate the distance to the object based on two optical images obtained through said respective optical systems;

distance-value selecting means for selecting and outputting one of distance measurement results obtained by said first and second distance measuring means;

power supply means for supplying a current to said first and second and said distance-value selecting means; and detecting means for detecting an output voltage from said power supply means, wherein said distance-value selecting means comprises setting means for setting a distance measurement range in which said first distance measuring means can properly execute distance measurement, based on the output voltage, detected by said detecting means, from said power supply means.

10. An apparatus according to claim 9, wherein said distance-value selecting means further comprises first check means for selecting the distance measurement result of said second distance measuring means when the distance measurement result of said first distance measuring means is a value falling outside the distance measurement range set by said setting means.

11. An apparatus according to claim 9, wherein said distance-value selecting means further comprises second check means for selecting the distance measurement result of said first distance measuring means when the distance measurement result of said first distance measuring means is a value falling within the distance measurement range set by said setting means.

12. An apparatus according to claim 9, wherein said distance measuring apparatus further comprises luminance determining means for detecting a luminance of an external field, and said distance-value selecting means further comprises first check means for selecting the distance measurement result of said second distance measuring means when the distance measurement result of said first distance measuring means is a value falling outside the distance measurement range set by said setting means, second check means for selecting the distance measurement result of said first distance measuring means when the distance measurement result of said first distance measuring means is a value falling within the distance measurement range set by said setting means, and third check means for checking whether the luminance of the external field obtained by said luminance detecting means is a value smaller than a predetermined intermediate level, and executes selection processing in said first or second check means when said third check means determines that the luminance of the external field is the value smaller than the intermediate level.

* * * * *